US012732391B2

(12) United States Patent
Zheng et al.

(10) Patent No.: US 12,732,391 B2
(45) Date of Patent: Sep. 8, 2026

(54) POWER-OVER-ETHERNET (PoE) DEVICE WITH MULTI-OUTPUT TRANSFORMER TO GENERATE OUTPUT PoE POWER AND DEVICE OPERATIONAL POWER

(71) Applicant: HEWLETT PACKARD ENTERPRISE DEVELOPMENT LP, Spring, TX (US)

(72) Inventors: Jiguang Zheng, Beijing (CN); Hailong Bai, Beijing (CN); Yuying Chen, Beijing (CN); Yue Sun, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 77 days.

(21) Appl. No.: 18/531,268

(22) Filed: Dec. 6, 2023

(65) Prior Publication Data

US 2025/0193034 A1 Jun. 12, 2025

(51) Int. Cl.

| | |
|---|---|
| ***H04L 12/10*** | (2006.01) |
| ***G06F 1/26*** | (2006.01) |
| ***H04L 12/40*** | (2006.01) |

(52) U.S. Cl.

CPC ................ *H04L 12/10* (2013.01); *G06F 1/26* (2013.01); *H04L 12/40045* (2013.01)

(58) Field of Classification Search

CPC ...... H04L 12/10; H04L 12/40045; G06F 1/26

See application file for complete search history.

(56) References Cited

U.S. PATENT DOCUMENTS

| | | | | |
|---|---|---|---|---|
| 8,674,546 B1 * | 3/2014 | Dix | ......................... | H04L 12/10 307/65 |
| 2006/0028188 A1 * | 2/2006 | Hartular | ................ | H02M 3/156 323/273 |
| 2008/0168283 A1 * | 7/2008 | Penning | .................. | G06F 1/263 713/310 |
| 2012/0153866 A1 * | 6/2012 | Liu | .................. | H02M 3/33561 363/21.18 |
| 2014/0284997 A1 * | 9/2014 | Wang | ...................... | H04L 12/10 307/1 |

(Continued)

OTHER PUBLICATIONS

Microchip.com, “PD-PSE With PD69200 PD69208M,” Part No. PD-IM-7608M-2, Product website, https://www.microchip.com/en-us/development-tool/pd-im-7608m-2#.

*Primary Examiner* — Jaweed A Abbaszadeh

(74) *Attorney, Agent, or Firm* — Jones Robb, PLLC

(57) ABSTRACT

A power-over-Ethernet (PoE) PD/PSE device comprises a powered device (PD) interface configured to connect to an upstream power sourcing equipment (PSE) and receive input PoE power from the PSE, and a PSE interface configured to connect to a downstream PD and to supply output PoE power to the PD. The PD/PSE also comprises a device power rail to supply operational power to one or more components of the PD/PSE, and a DC-DC converter comprising a multi-output transformer comprising a transformer input, a first transformer output electrically connected to the PSE interface, and a second transformer output electrically connected to the device power rail. The DC-DC converter is configured to receive the input PoE power and, in response, supply the input PoE power to the transformer input, generate the output PoE power at the first transformer output, and generate the operational power at the second transformer output.

20 Claims, 5 Drawing Sheets

(56) References Cited

U.S. PATENT DOCUMENTS

| | | | | |
|---|---|---|---|---|
| 2016/0064939 | A1* | 3/2016 | Lai | H04L 12/10 307/1 |
| 2016/0323115 | A1 | 11/2016 | Zhang et al. | |
| 2017/0214533 | A1* | 7/2017 | Chen | H04L 12/10 |
| 2017/0310491 | A1 | 10/2017 | Dwelley et al. | |
| 2023/0238892 | A1* | 7/2023 | Tange | H02M 3/158 363/16 |
| 2024/0345642 | A1* | 10/2024 | Gourari | G06F 1/3203 |

* cited by examiner

5

10
20
75
PD/PSE
PSE
90
91
92
PD+
PD-
PoE Power Reception Circuitry 45
60
66-1 (66)
$V_{DD\_2}$
$V_{SS\_2}$
Multi-output Transformer 65
66-2 (66)
PSE+
PSE-
PSE Power Output Circuitry 70
$V_{DD}$
$V_{SS}$
$V_{DD}$
$V_{SS}$
PWM Switching Circuitry 61
$V_{DD\_3}$
$V_{SS\_3}$
Device Power Rail(s) 71
DC input 48
96
95
PD
94

6
PD/PSE
10
20
PD+
PD-
PoE Power Reception Circuitry 45
$V_{DD}$
$V_{SS}$
DC input 48
DC+/DC-
98
Power Source
97
60
Multi-output Transformer 65
PWM Switching Circuitry 61
$V_{DD}$
$V_{SS}$
66-1 (66)
$V_{DD\_2}$
$V_{SS\_2}$
PSE Power Output Circuitry 70
PSE+
PSE-
75
66-2 (66)
$V_{DD\_3}$
$V_{SS\_3}$
Device Power Rail(s) 71
96
95
PD
94

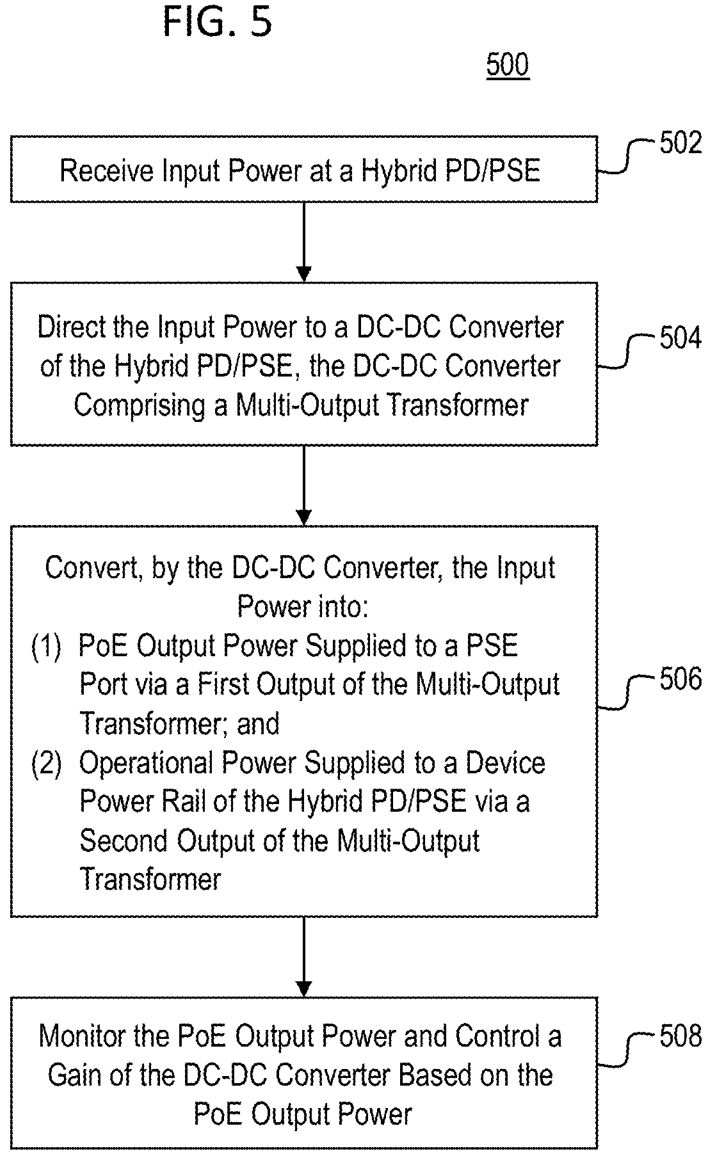
FIG. 5
500
Receive Input Power at a Hybrid PD/PSE
502
Direct the Input Power to a DC-DC Converter of the Hybrid PD/PSE, the DC-DC Converter Comprising a Multi-Output Transformer
504
Convert, by the DC-DC Converter, the Input Power into:
(1) PoE Output Power Supplied to a PSE Port via a First Output of the Multi-Output Transformer; and
(2) Operational Power Supplied to a Device Power Rail of the Hybrid PD/PSE via a Second Output of the Multi-Output Transformer
506
Monitor the PoE Output Power and Control a Gain of the DC-DC Converter Based on the PoE Output Power
508

POWER-OVER-ETHERNET (PoE) DEVICE WITH MULTI-OUTPUT TRANSFORMER TO GENERATE OUTPUT PoE POWER AND DEVICE OPERATIONAL POWER

INTRODUCTION

Power-over-ethernet (PoE) allows for data signals and electrical power signals to be communicated over the same ethernet cable. This ability to receive power and data via the same cable may provide more flexibility in how the device can be deployed (e.g., the device may no longer need to be positioned near a power outlet or have long power cables to reach such an outlet) and/or may provide the device with a power redundancy. In a PoE system, a device that provides the PoE power to other connected devices is referred to as a Power Sourcing Equipment (PSE) and the devices that receive the PoE power from the PSE are referred to as Powered Devices (PD). Often, a PSE also serves as a networking element for directing data traffic through the network, such as a network switch or router. PDs may also be networking elements (e.g., a wireless access point, a PoE repeater/hub, etc.), or client devices (e.g., a security camera, an internet-of-things (IoT) device, etc.), or any other electronic device with PoE capability.

Some networking devices may function as both a PD and a PSE. These devices may be referred to herein as a "hybrid PD/PSE" or a "PD/PSE" for short. The hybrid PD/PSE may comprise circuitry to receive PoE power from an upstream PSE (thus acting as a PD) and circuitry to supply PoE power to a downstream PD (thus acting as a PSE). The circuitry to receive the PoE power includes a port which is typically referred to as a PD port, whereas the circuitry to supply the PoE power includes a port which is typically referred to as a PSE port. In some hybrid PD/PSE, an input power port may also be provided which can receive a power cord plugged into a power source (e.g., mains power), thus allowing the device to be powered by either PoE or by the power cord.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings:

FIG. 5 is a process flow diagram illustrating an example method.

DETAILED DESCRIPTION

Figure 1:
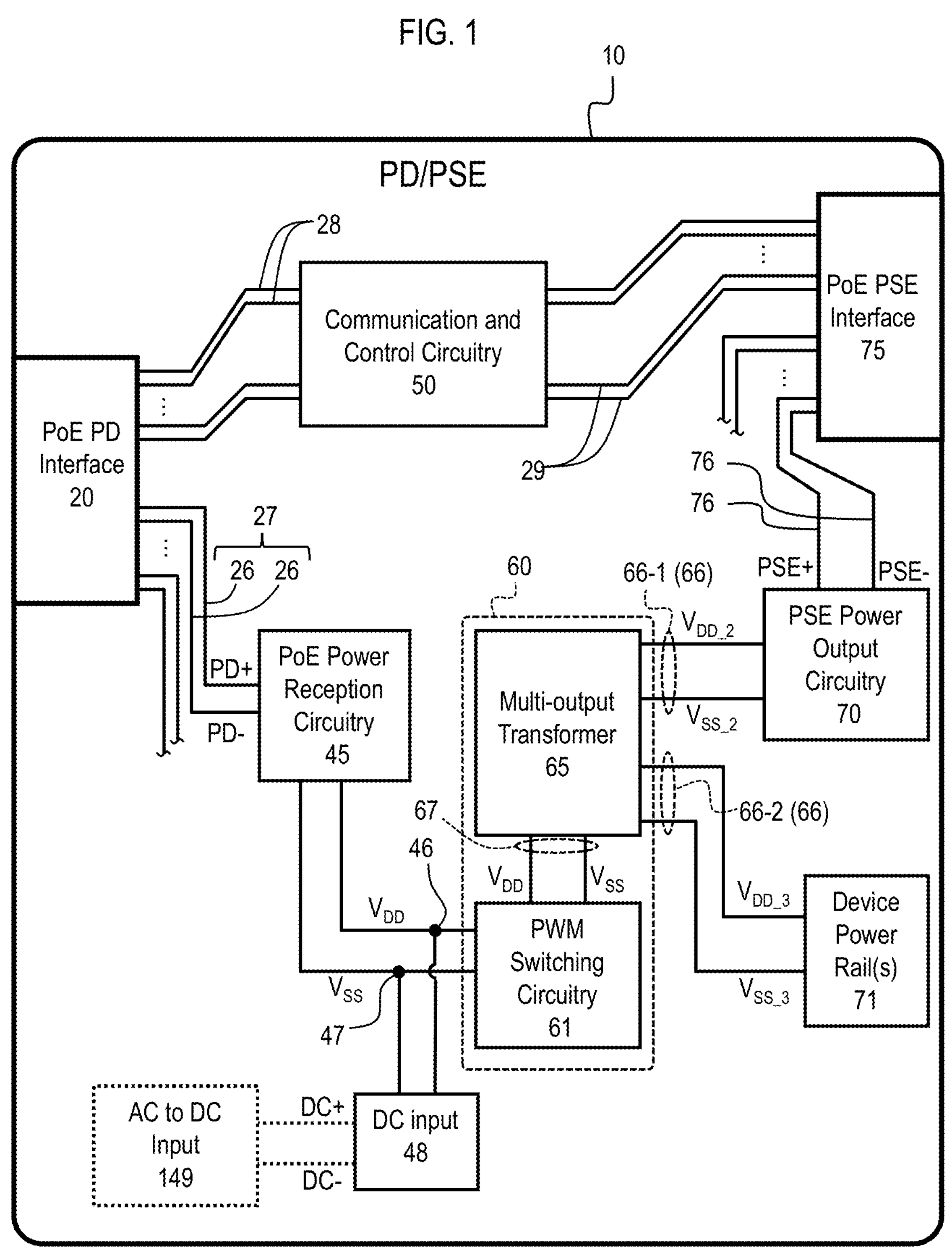
FIG. 1 is a block diagram illustrating an example hybrid PD/PSE.

In many hybrid PD/PSEs, the PD port and/or the input power port (if one is present) are electrically connected to the PSE port. For example, a positive power rail may be connected to the PD port, the input power port (if one is present), and to the PSE port, thus forming a current path between the PD port and the PSE port, or between the input power port and the PSE port. Accordingly, the input power received at either the PD port or the input power port is conveyed, more-or-less unchanged, directly to the PSE port for being output as the output PoE power.

In hybrid PD/PSEs such as those described above, a situation can arise in which the PoE power output by the PD/PSE falls out of specification (e.g., the voltage drops below a specified minimum PSE output voltage). The output PoE power may drop below the specified minimum PSE output voltage if the input power, which is received via either the PD port or the input power port, is at a voltage that is lower than the specified minimum PSE output voltage (because in these devices the output PoE power has essentially the same voltage as the input power). This dropping of the PoE power out of specification can cause a PD connected to the PSE port to fail to power on or otherwise impair the functioning of the network. It can also lead to unnecessary and wasteful repair calls or returns of the device to the manufacturer.

The input power may be below the specified minimum PSE output voltage, and hence cause the output PoE power to fall out of specification, for a variety of reasons. For example, cables and other circuitry between the upstream PSE and the PD/PSE have some resistance, which increases as the length of the cable increases (e.g., about 0.188 Ohm per meter for CAT5e cable), and this resistance causes a voltage drop to occur between the upstream PSE and the PD/PSE. Thus, if the PD/PSE is being powered by PoE, the received PoE power will have a lower voltage than it had when it was generated at the upstream PSE, and the drop in voltage may be significant enough to cause the output PoE power to drop out of specification. Note that this can occur even if the upstream PSE is operating correctly and even if the received PoE power is within specification when received.

The reason that the received PoE power which is within specification may not be sufficient to generate output PoE power that is within specification is because there are different standards specified for PoE power output by a PSE (referred to herein as the PSE output voltage requirement) and PoE power received at a PD (referred to herein as the PD input voltage requirement). For example, IEEE 802.3at (PoE+) specifies a PSE output voltage requirement of 50-57V and a PD input voltage requirement of 42-57V. Thus, for example, it could so happen that the upstream PSE generates an output PoE signal of 50V (which is within the PSE output voltage requirements), then due to resistance the PoE signal received at the PD port may drop to 48V (which is within the PD input voltage requirement), and then PSE port may output a PoE signal at 48V (which is below the specified minimum of the PSE output requirement). Thus, although the original PoE signal output by the upstream PoE was within PSE output voltage requirements and the received PoE signal was also within PD input voltage requirements, nevertheless the PoE signal output from the PSE port is below the PSE output voltage requirements.

Another way that the input power may fall below the specified minimum PSE output voltage is if the input power port is being used to power the PD/PSE and the power source supplying the input power does not supply sufficient voltage. For example, many power adapters for supplying input power to networking devices supply 48V or less, and therefore the PoE power output from the PSE port may also be limited to 48V or less, which might be lower than the specified minimum PSE output voltage (e.g., in IEEE 802.3at, PoE+ the minimum is 50V; in IEEE 802.3bt the minimum is 52V).

In addition to potentially not being able to generate an output PoE power that is within specification, existing PD/PSEs may be at increased risk of damage due to surge currents. In particular, because the PD port and the PSE port are not electrically isolated, surges appearing on one or the other can pass through the device and potentially damage circuitry therein.

Furthermore, in some PD/PSE, the positive and ground/negative legs of the circuit between the PD port and the PSE port are imbalanced. In particular, the positive leg comprises the positive rail mentioned above, which connects the PD port to the PSE port. The ground/negative leg also comprises a rail, called herein a ground rail, but unlike the positive rail the ground rail is not directly connected to the PD port and the PSE port. Instead, a PD chip and a PSE chip (described in more detail below) are interposed between the PD port and the ground rail and between the ground rail and the PSE port, respectively. The current paths through these PD and PSE chips have a finite resistance, for example due to transistors in the current path (e.g., each MOSFET may introduce around 0.1 Ohm resistance). Because the ground/negative leg has this resistance but the positive leg does not, a DC voltage offset is introduced between the two legs.

To address the issues noted above, examples disclosed herein comprise a hybrid PD/PSE with a multi-output transformer disposed between the PD port and the PSE port. More specifically, the multi-output transformer comprises an input connected to the PD port, a first transformer output coupled to the PSE port, and one or more second transformer outputs coupled to one or more device power rails (the device power rails supply operational power to the other components of the PD/PSE). In some examples the PD/PSE also comprises an input power port to receive input power from some other power source (e.g., mains power), and both the PD port and the input power port are electrically connected to the input of the multi-output transformer. Switching circuitry and the multi-output transformer together form a DC-DC converter, which converts the input power from the PD port or from the input power port into: (1) an output PoE power signal supplied to the PSE port (via the first transformer output); and (2) one or more operational power signals supplied to the device power rails (via the second transformer outputs). The conversion may comprise boosting (amplifying) the input power into a higher voltage output PoE power signal. In particular, the output PoE voltage is monitored and the switching circuitry controls the gain of the DC-DC converter based thereon such that the output PoE voltage is kept above a specified minimum. In this manner, even if the input power has a voltage that is lower than the specified minimum (e.g., for any of the reasons discussed above), nevertheless the output PSE voltage remains within specifications.

In addition to ensuring that the output PoE power remains within specifications, the transformer also provides galvanic isolation between the PD port and the PSE port, and also between the power input port and the PSE port. This can reduce the likelihood of damage from surge events. Furthermore, this separation between the PD port side and the PSE port side also reduces the magnitude of the DC offset described above.

Turning now to the figures, various devices, systems, and methods in accordance with aspects of the present disclosure will be described.

FIG. 1 is a block diagram conceptually illustrating a hybrid PD/PSE ("PD/PSE") 10 for use in a power-over-Ethernet ("PoE") system. It should be understood that FIG. 1 is not intended to illustrate specific shapes, dimensions, or other structural details accurately or to scale, and that implementations of the PD/PSE 10 may have different numbers and arrangements of the illustrated components and may also include other parts that are not illustrated.

As shown in FIG. 1, the PD/PSE 10 comprises a PoE PD interface 20 to connect to an Ethernet cable, PoE power reception circuitry 45 to receive and process PoE power signals from the PoE PD interface 20, communication and control circuitry 50 to receive and process data signals from the PoE PD interface 20, a DC-DC converter 60, PSE power output circuitry 70, and a PoE PSE interface 75. These and other components of the PD/PSE 10 will be described in turn below.

The PoE PD interface 20 comprises a port (not illustrated), such an RJ45 jack, configured to receive a connector of an ethernet cable, which may include an RJ45 connector. The PoE PD interface 20 is configured to send and receive data signals, and also receive PoE power signals, via the ethernet cable (in a state of the ethernet cable being connected between the PoE PD interface 20 and a PSE). Moreover, the PoE PD interface 20 may include circuitry (not illustrated) to receive and route the data and PoE power signals, such as electrical pins/contacts, transformers, switches, and/or other circuitry, as would be familiar to those of ordinary skill in the art. In particular, the PoE PD interface 20 is configured to direct the input PoE power to power lines 26, whereas data signals are communicated via data lines 28. In some examples, each PoE power signal is a DC electrical signal comprising a relatively constant voltage difference applied between a pair 27 of the power lines 26, while each data signal comprises a differential signal comprising two alternating signals which have opposite polarities relative to one another and which are applied to a pair of the data lines 28. In particular, the PoE power signal comprises the voltage difference between a larger potential PD+ carried on one of the power lines 26 and a smaller potential PD− carried on the other of the power lines 26. The input PoE power signal may thus be referred to herein using the notation PD+/PD− (in this context, the character "/" is a forward-slash or stroke, not a mathematical operator). In FIG. 1 one PoE PD interface 20 is shown, but any number of PoE PD interfaces 20 equal to or greater than one may be included in the PD/PSE 10.

As noted above, the PD/PSE 10 also comprises PoE reception circuitry 45 connected to the PoE PD interface 20. The PoE reception circuitry 45 may comprise rectifiers, a PD chip, EMI capacitors, and other components as would be familiar to those of ordinary skill in the art. If the input PoE power PD+/PD− is received from the PD interface 20, this input power PD+/PD− is supplied to the PoE reception circuitry 45, and then this input power PD+/PD− flows from the PoE reception circuitry 45 to the nodes 46 and 47, with PD+ being applied to the node 46 and PD− being applied to the node 47.

In some examples, the PD/PSE 10 also comprises DC input 48. This comprises a port to receive a power cord which can supply DC power from an external source, such as from an external AC to DC power adapter 149 plugged into mains power or any other desired power source. The DC input 48 receives input power including a voltage difference between a larger potential DC+ on one power line and a smaller potential DC− on another power line. The input DC power signal may thus be referred to herein using the notation DC+/DC−. This input DC power DC+/DC− then flows from the DC input 48 to the nodes 46 and 47, with DC+ being applied to the node 46 and the DC− being applied to the node 47.

As shown in FIG. 1, in examples in which the DC input 48 is provided, the input DC power DC+/DC− from the DC input 48 and the input PoE power PD+/PD− from the PoE power reception circuitry 45 are both directed to the same nodes 46 and 47. The potentials of these nodes 46 and 47 are labeled $V_{DD}$ and $V_{SS}$ in FIG. 1, and the input power signal received at this portion of the circuitry is referred to herein as the input power $V_{DD}/V_{SS}$. The input power $V_{DD}/V_{SS}$ will be the same as the input PoE power PD+/PD− or the input DC power DC+/DC−, depending on which power source is currently powering the PD/PSE 10. That is, if the PD/PSE 10 is currently being powered via the DC input 48, then the potentials $V_{DD}$ and $V_{SS}$ will be equal to the potentials DC+ and DC−, respectively; and if the PD/PSE 10 is currently being powered via the PoE PD interface 20, then the potentials $V_{DD}$ and $V_{SS}$ will be equal to the voltages PD+ and PD−, respectively. The term "input power" or similar (including "input power $V_{DD}/V_{SS}$") is thus used herein as a general term for whichever input power happens to be received at the nodes 46 and 47.

In some examples, a PD chip in the PoE power reception circuitry 45 monitors whether the input DC power DC+/DC− is being received at the DC input 48, if so, blocks the PoE power reception circuitry 45 may block the input PoE power PD+/PD− from passing to the nodes 46 and 47, and if not, the PoE power reception circuitry 45 may allow the PoE power PD+/PD− to pass to the nodes 46 and 47. Nodes 46 and 47 are coupled to an input of the DC-DC converter 60, and thus the input power $V_{DD}/V_{SS}$ at nodes 46 and 47 (i.e., the voltage difference $V_{DD}-V_{SS}$ between nodes 46 and 47) is supplied to the DC-DC converter 60 for conversion (e.g., voltage boosting or reduction).

The DC-DC converter 60 comprises pulse-width-modulation (PWM) switching circuitry 61 and a multi-output transformer 65. The pulse-width-modulation (PWM) switching circuitry 61 receives the input power $V_{DD}/V_{SS}$ from nodes 46 and 47 and supplies that input power $V_{DD}/V_{SS}$ to an input 67 of the pulse-width-modulation (PWM) switching circuitry 61 in pulses that repeat at a predetermined frequency. These pulses are generated by switching ON and OFF one or more switches disposed in a current path between the nodes 46 or 47 and the input 67 of the transformer 65. For example, a switch may be disposed in series in the $V_{DD}$ current path between the node 46 and the transformer input 67, or in the $V_{SS}$ current path between the node 47 and the transformer input 67, such that when the switch is ON (conductive), the input power voltage $V_{DD}-V_{SS}$ is applied to the transformer input 67, and when the switch is OFF (not conductive), the input power voltage $V_{DD}-V_{SS}$ is not applied to the transformer input 67. The amount of time that the switch is ON during each pulse cycle, relative to the total cycle period, is referred to as a duty cycle of the switching circuitry 61. For example, if the pulses are applied once every microsecond, then a duty cycle of 50% would mean that, during each pulse cycle, the switches are ON for 0.5 microseconds followed by OFF for 0.5 microseconds. A signal which controls the duty cycle may be referred to as a PWM signal. The PWM switching circuitry 61 is configured to adjust a gain of the DC-DC converter by adjusting the duty cycle.

The multi-output transformer 65 comprises a primary side comprising the input 67 and primary windings coupled to the input 67. The transformer 65 also comprises a secondary side comprising a first output 66-1, first secondary windings coupled to the first output 66-1, a second output 66-2, and second secondary windings coupled to the second output 66-2. The transformer 65 further comprises a core, which the primary side windings, first secondary side windings, and second secondary side windings are wound around.

Based on the input signal $V_{DD}/V_{SS}$ comprising voltage $V_{DD}-V_{SS}$, the transformer 65 generates an output PoE power signal $V_{DD\_2}/V_{SS\_2}$ comprising voltage $V_{DD\_2}-V_{SS\_2}$, which is output via the first transformer output 66-1. This output PoE power signal $V_{DD\_2}/V_{SS\_2}$ is then fed to PSE power output circuitry 70, which is described below. In addition, based on the input signal $V_{DD}/V_{SS}$, the transformer 65 generates an operational power signal $V_{DD\_3}/V_{SS\_3}$ comprising voltage $V_{DD\_3}-V_{SS\_3}$, which is output via the second transformer output 66-2. This operational power signal $V_{DD\_3}/V_{SS\_3}$ is then fed to device power rail 71, which supplies power to one or more components of the PD/PSE. The output PoE power signal $V_{DD\_2}/V_{SS\_2}$ and the operational power signal $V_{DD\_3}/V_{SS\_3}$ have different voltages. For example, in some implementations, the voltage $V_{DD\_2}-V_{SS\_2}$ of the PoE power signal $V_{DD\_2}/V_{SS\_2}$ may be 24V, 48V, 54V, or any other voltage that satisfied one of the PoE industry standards, whereas the voltage $V_{DD\_2}-V_{SS\_2}$ of the operational power signal $V_{DD\_3}/V_{SS\_3}$ may be 12 V, 5V, or 3.3V.

The different output voltages may be achieved by providing different turn ratios between the primary windings and the two secondary windings. The ratio of turns between the primary windings and the first secondary windings is designed herein $N_p/N_{s1}$, and the ratio of turns between the primary windings and the first secondary windings is designed herein $N_p/N_{s2}$, wherein $N_p$ is the turn number of the primary winding, $N_{s1}$ is the turn number of the first secondary winding, and $N_{s2}$ is the turn number of the second secondary winding. The output voltage at each transformer output is generally inversely proportional to the turns ratio of the corresponding winding, and thus in various implementations the desired output voltages may be achieved by appropriately setting the turns rations of the primary and the multiple secondary windings. For example, in some implementations turns ratios of about $N_p/N_{s1}$=0.5 and $N_p/N_{s2}$=2 are used (in some examples, $N_p/N_{s1}$=0.5 and $N_p/N_{s2}$=2.25), which can be used to produce an output PoE power signal $V_{DD\_2}/V_{SS\_2}$ having a voltage of 54V and an operational power signal $V_{DD\_3}/V_{SS\_3}$ having a voltage of 12V.

The output voltages from the transformer 65 also depend on the voltage of the input power $V_{DD}/V_{SS}$ and the duty cycle of the switching circuitry 61. Thus, if the voltage of the input power $V_{DD}/V_{SS}$ changes, the desired output voltages at the transformer outputs 66-1 and 66-2 can be maintained by altering the duty cycle of the switching circuitry 61 to compensate for the change in input voltage. In particular, the following equation indicates the relationship between output voltage and the other $$V_{out\_i} = V_{in} D \frac{N_{s\_i}}{N_p} \quad \text{(eq. 1)}$$

where $V_{out\_i}$ is the output voltage of the $i^{th}$ transformer output **66-*i*** (e.g., $V_{out\_1}=V_{DD\_2}-V_{SS\_2}$ and $V_{out\_2}=V_{DD\_3}-V_{SS\_3}$); D is the duty cycle; Vin is the input voltage (i.e., $V_{DD}-V_{SS}$), $N_{s\_i}$ is the number of windings of the $i^{th}$ secondary winding, and $N_p$ is the number of windings of the primary winding. If a desired target output voltage is known, then equation 1 can be rearranged to indicate the duty cycle that is needed to achieve the target output voltage as a function of input voltage:

$$D = \frac{V_{out\_i} \cdot N_p}{V_{in} \cdot N_{s\_i}} \quad \text{(eq. 2)}$$

The PWM switching circuitry 61 may be configured to monitor the output PoE power signal $V_{DD\_2}/V_{SS\_2}$ at the first transformer output 66-1 and control the duty cycle D so as to maintain the voltage $V_{DD\_2}-V_{SS\_2}$ at a specified target value (or within a specified range). For example, feedback circuitry may measure the voltage $V_{DD\_2}-V_{SS\_2}$ and feedback information to the PWM switching circuitry 61 indicative of the measured voltage, and the PWM switching circuitry 61 may then adjust the duty cycle accordingly. That is, if the voltage $V_{DD\_2}-V_{SS\_2}$ is less than the predetermined target, the switching circuitry may increase the duty cycle D by a predetermined amount (or by an algorithmically determined amount), and if the voltage $V_{DD\_2}-V_{SS\_2}$ is less than the predetermined target, the switching circuitry may decrease the duty cycle D by a predetermined amount (or by an algorithmically determined amount). Algorithmically determined adjustment amounts may include amounts determined according to a proportional integral derivative (PID) control approach, for example. In addition, in some examples some hysteresis may be built in to the adjustment process to avoid continual back-and-forth changing of the duty cycle around the target value; for example, rather than adjusting the duty cycle D the moment the voltage $V_{DD\_2}-V_{SS\_2}$ drops slightly below or rises slightly above the target value, instead thresholds on either side of the target value may be used and the adjustment occurs only if the voltage $V_{DD\_2}-V_{SS\_2}$ passes the thresholds.

For example, in one implementation the target voltage for the output PoE power $V_{DD\_2}/V_{SS\_2}$ is 54V, which complies with multiple PoE industry standards, including IEEE 802.3af, 802.3at, 802.3bt Type 3, and 803.3bt Type 4. In addition, in this example, the turn ratio of the primary to first secondary winding is $N_p/N_{s1}$=0.5. In such an implementation, the output PoE power can be maintained at 54V for a variety of input power voltages by setting the duty cycle as shown in Table 1 below:

TABLE 1

| Voltage of Input Power $V_{DD}$-$V_{SS}$ | Duty Cycle Needed to Maintain 54 V Output PoE $V_{DD2}$-$V_{SS2}$ |
|---|---|
| 37 | 73.0% |
| 38 | 71.1% |
| 39 | 69.2% |
| 40 | 67.5% |
| 41 | 65.9% |
| 42 | 64.3% |
| 43 | 62.8% |
| 44 | 61.4% |
| 45 | 60.0% |
| 46 | 58.7% |
| 47 | 57.4% |
| 48 | 56.3% |
| 49 | 55.1% |
| 50 | 54.0% |
| 51 | 52.9% |
| 52 | 51.9% |
| 53 | 50.9% |
| 54 | 50.0% |

In addition, to continue the example from above, if the target voltage for the operational power $V_{DD\_3}/V_{SS\_3}$ is 12 V, then this target voltage can be achieved for each of the above-noted input voltages if the turns ratio of the primary to second secondary inputs $N_p/N_{s2}$ is set to 2.25.

It should be noted that other turns ratios besides those noted above could be used. For a given desired target output power, there are multiple combinations of turns ratios that will work to produce the desired target output power. For example, to achieve the same 54V and 12V output powers described above, the following (non-exhaustive) list of turn ratio combinations would work: $N_p/N_{s1}$=0.4 and $N_p/N_{s2}$=1.8; $N_p/N_{s1}$=0.45 and $N_p/N_{s2}$=2; $N_p/N_{s1}$=0.5 and $N_p/N_{s2}$=2.25; and $N_p/N_{s1}$=0.6 and $N_p/N_{s2}$=2.7. In addition, in some cases precision is not as necessary for the operational power $V_{DD\_3}/V_{SS\_3}$, and therefore the turns ratio for the second secondary winding does not necessarily have to be as precise. For example, in some implementations, a turns ration of $N_p/N_{s1}$=0.5, $N_p/N_{s2}$=2 is used, which maintains the output PoE power voltage at 54V and produces the operational power at 13.5V—while this overshoots the desired 12V for the operational power, in some cases this small overshoot is acceptable.

In FIG. 1, only one second transformer output 66-2 is illustrated to simplify the discussion and aid understanding. However, any number of second transformer outputs **66-*n* may be included, each having its own associated secondary winding of the transformer 65 and each receiving its own operational power signal. The voltage of the operational power signal supplied to these additional second transformer outputs 66-*n* would be based on their respective turn ratios, just like with the outputs 66-1 and 66-2** described above.

It may be noted that, in some examples, the operational power signal $V_{DD\_3}/V_{SS\_3}$ output to the second transformer outputs 66-2 is not controlled directly. In other words, the PWM switching circuitry 61 does not actively monitor the voltage $V_{DD\_3}-V_{SS\_3}$ or make any adjustments based thereon. However, the voltage $V_{DD\_3}-V_{SS\_3}$ can be maintained within acceptable limits by appropriately setting the turns ratios $N_p/N_{s1}$ and $N_p/N_{s2}$ (and if other second transformer outputs are present, then their respective turns ratios as well). More specifically, the voltage output to the second transformer output 66-2 is proportional to the voltage output to the first transformer output 66-1, with the turns ratios thereof controlling the proportion, and therefore, if the turns ratios are appropriately set, the PWM switching circuitry 61 can indirectly control the operational power signal $V_{DD\_3}/V_{SS\_3}$ by controlling the output PoE power signal $V_{DD\_2}/V_{SS\_2}$. If the desired output voltages are known, the appropriate turns ratios can be determined using the following equation:

$$\frac{V_{out\_1}}{V_{out\_2}} = \frac{\frac{N_p}{N_{s1}}}{\frac{N_p}{N_{s2}}} = \frac{N_{s2}}{N_{s1}} \quad \text{(eq. 3)}$$

As noted above, the output PoE power $V_{DD\_2}/V_{SS\_2}$ is supplied from the first transformer output 66-1 to the PSE power output circuitry 70. The PSE power output circuitry 70 comprises circuitry which controls provisioning of PoE power to downstream PDs via the PoE PSE interface 75. For example, the PSE power output circuitry 70 may comprise a PSE chip. The PSE chip may perform PD detection and PD classification, among other operations, and control the supply of the output PoE power $V_{DD\_2}/V_{SS\_2}$ to the PoE PSE interface 75 based thereon. The output PoE power $V_{DD\_2}/V_{SS\_2}$ may also be referred to as output PoE power PSE+/PSE− when referring to portions downstream of the PSE power output circuitry 70.

The PoE PSE interface 75 comprises a port (not illustrated), such an RJ45 jack, configured to receive a connector of an ethernet cable, which may include an RJ45 connector. The PoE PSE interface 75 is configured to send and receive data signals, and supply the output PoE power signal PSE+/PSE−, via the ethernet cable (in a state of the ethernet cable being connected between the PoE PSE interface 75 and a PD). The PoE PSE interface 75 is configured to receive the output PoE power PSE+/PSE− via power lines 76, with a larger potential PSE+ carried on one of the power lines 76 and a smaller potential PSE− carried on another of the power lines 76. (Note that PSE+ and PSE− are the same as $V_{DD\_2}$ and $V_{SS\_2}$, respectively). The PoE PSE interface 75 is also configured to communicate data via the data lines 29. In FIG. 1 one PoE PSE interface 75 is shown, but any number of PoE PD interfaces 20 equal to or greater than one may be included in the PD/PSE 10.

The PD/PSE 10 also comprises communication and control circuitry 50. The communication and control circuitry 50 is connected to the data lines 28 and data lines 29, and is configured to receive, apply, route, and/or process the data signals communicated over the data lines 28 and 29. In some examples, the communication and control circuitry 50 may comprise Ethernet PHY chips, which handle the translations between physical layer Ethernet communications and higher-level communication signals communicated with other portions of the circuitry 50 (such as a CPU) or other portions of the PD/PSE 10. In particular, a first Ethernet PHY chip may handle translations of communications between the PD interface 20 and the remainder of the circuitry 50, whereas a second Ethernet PHY chip may handle translations of communications between the PSE interface 75 and the remainder of the circuitry 50. In some examples, the PD/PSE 10 is configured to have switching and/or routing capabilities, and the communication and control circuitry 50 may include switching circuitry (e.g., a switching crossbar, a switching ASIC, etc.) configured to switchably connect the data lines 28 and/or 29 to other communications interfaces (e.g., other ports) to allow communications to flow between these interfaces. For example, such switching circuitry may route communications between PD interface 20 and PSE interface 75, between PD interface 20 and another communication interface (not illustrated), between PSE interface 75 and another communication interface (not illustrated), and/or between PD interface 20 or PSE interface 75 and some other component of the PD/PSE 10. In some examples, the communication and control circuitry 50 may comprise processing circuitry configured to control various operations of the PD/PSE 10, such as a processor, system-on-chip (SoC), ASIC, or other processing circuitry.

Figure 2:
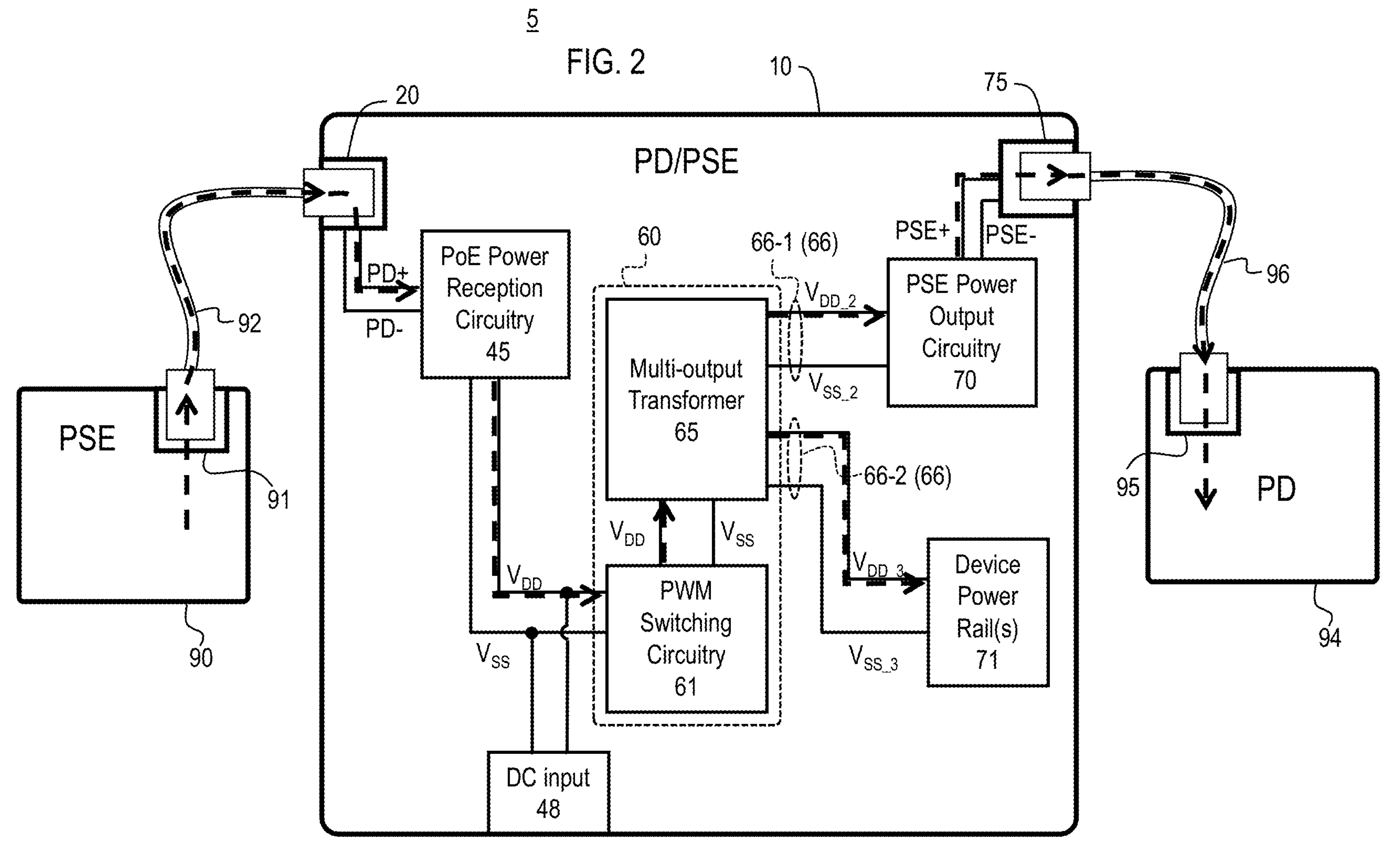
FIG. 2 is a block diagram illustrating an example system comprising the PD/PSE of FIG. 1.

Turning now to FIG. 2, an example system 5 will be described. The system 5 comprises the PD/PSE 10 described above, an upstream PSE 90, and a downstream PD 94. As shown in FIG. 2, the upstream PSE 90 is connected to the PD/PSE 10 via a cable 92 which is plugged into a PSE port 91 of the upstream PSE 90 and the PD interface 20 of the PD/PSE 10. Moreover, the downstream PD 94 is connected to the PD/PSE 10 via a cable 96 which is plugged into the PSE interface 75 of the PD/PSE 10 and to a PD port 95 of the PD 94. Thus, as indicated by the dash-lined arrows in FIG. 2, input PoE power PD+/PD− may flow from the upstream PSE 90 into the PD/PSE 10 via the PD interface 20 becoming the input power $V_{DD}/V_{SS}$, the input power $V_{DD}/V_{SS}$ is then directed to the DC-DC converter 60 via the PoE Power reception circuitry 45, is converted by the DC-DC converter 60 into output PoE power $V_{DD\_2}/V_{SS\_2}$ output from the first transformer output 66-1 to the PSE power output circuitry 70, and then this output PoE power $V_{DD\_2}/V_{SS\_2}$ becomes the output PoE power PSE+/PSE− output from the PSE interface 75 to the PD 94. In addition, the input power $V_{DD}/V_{SS}$ is also converted by the DC-DC converter 60 into the operational power signal $V_{DD\_3}/V_{SS\_3}$ output from the second transformer output 66-2 and supplied to the device power rails 71.

Figure 3:
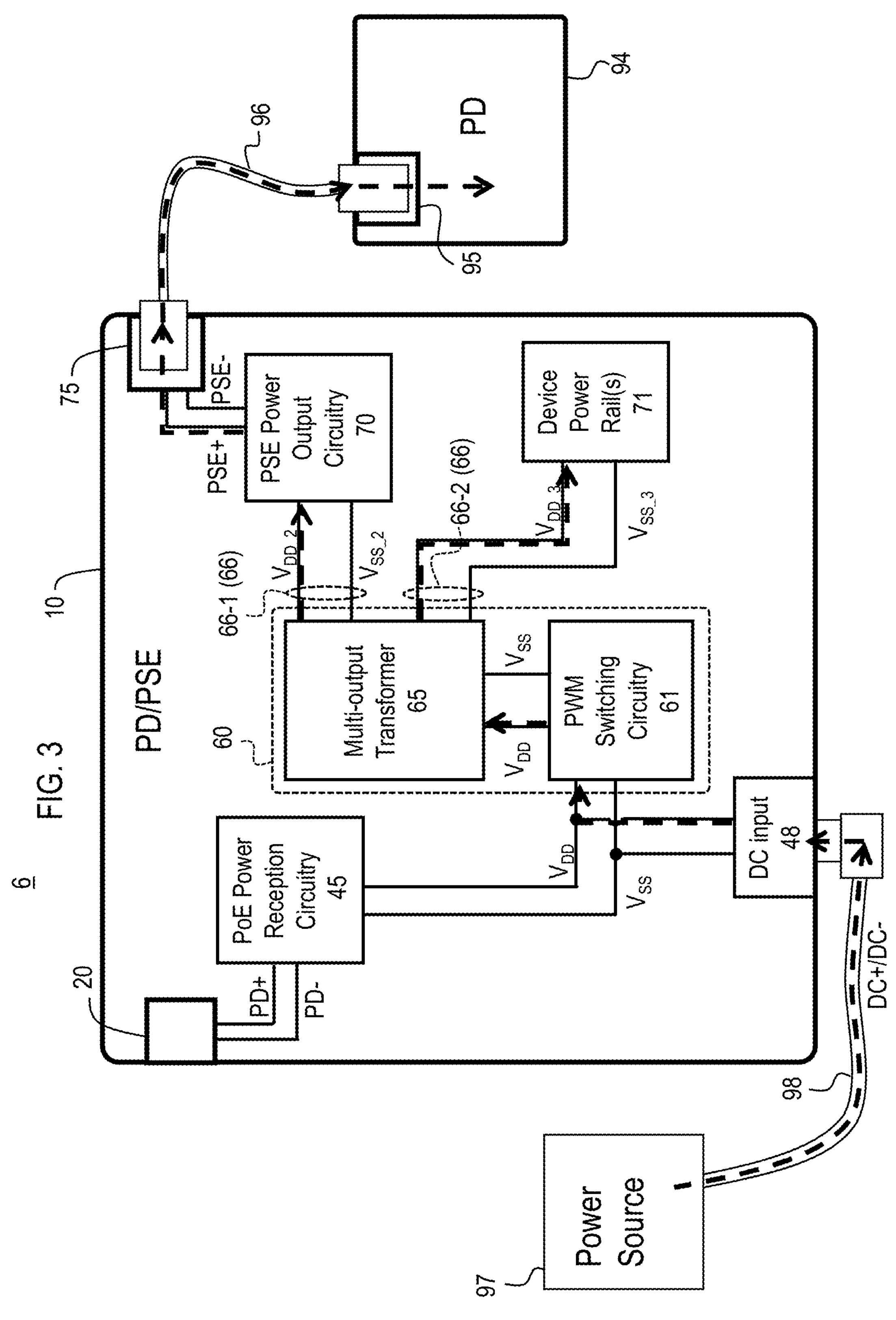
FIG. 3 is a block diagram illustrating another example system comprising the PD/PSE of FIG. 1.

Turning now to FIG. 3, an example system 6 will be described. The system 6 comprises the PD/PSE 10 described above, and external power source 97, and a downstream PD 94. The external power source 97 may comprise an AC-DC power adapter plugged into an AC power source (such as mains power), or a DC power cord plugged into a DC power source. As shown in FIG. 3, the external power source 97 is connected to the PD/PSE 10 via power cord 98, which is plugged into the DC input 48 of the PD/PSE 10. Moreover, the downstream PD 94 is connected to the PD/PSE 10 via a cable 96 which is plugged into the PSE interface 75 of the PD/PSE 10 and to a PD port 95 of the PD 94. Thus, as indicated by the dash-lined arrows in FIG. 3, input DC power DC+/DC− may flow from the power source 97 into the PD/PSE 10 via the DC input 48 becoming the input power $V_{DD}/V_{SS}$, the input power $V_{DD}/V_{SS}$ is then directed to the DC-DC converter 60 via the PoE Power reception circuitry 45, is converted by the DC-DC converter 60 into to output PoE power $V_{DD\_2}/V_{SS\_2}$ output from the first transformer output 66-1, and then this output PoE power $V_{DD\_2}/V_{SS\_2}$ is provided to the PD 94 via the PSE power output circuitry 70 and the PSE interface 75. In addition, the input power $V_{DD}/V_{SS}$ is also converted by the DC-DC converter 60 into the operational power signal $V_{DD\_3}/V_{SS\_3}$ output from the second transformer output 66-2 and supplied to the device power rails 71.

Figure 4:
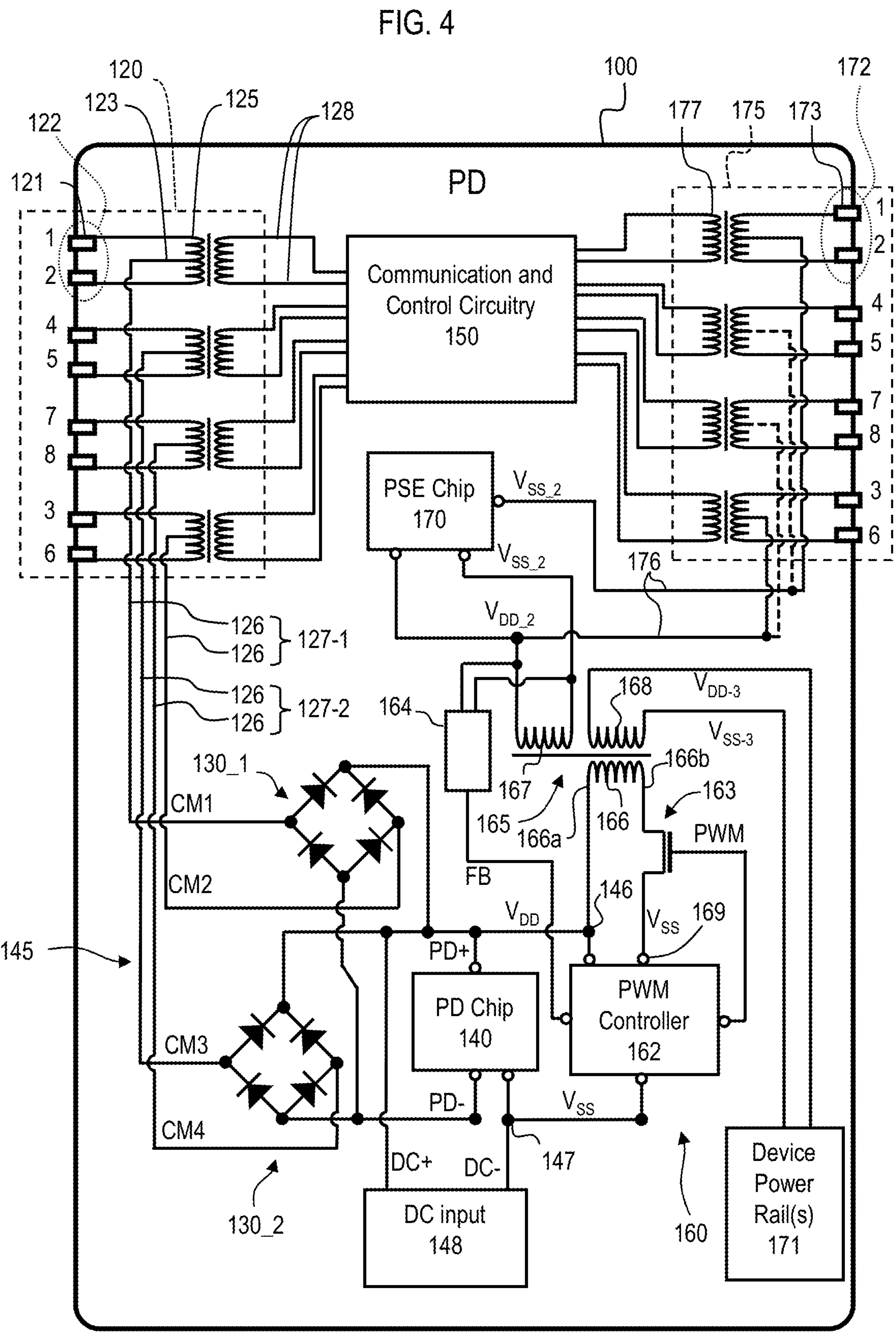
FIG. 4 is a schematic diagram illustrating another example hybrid PD/PSE.

Turning now to FIG. 4, an example PD/PSE 100 will be described. The PD/PSE 100 is one example implementation of the PD/PSE 10 described above, and thus certain components of the PD/PSE 100 correspond to (i.e., are the same as or are an example implementation of) components of the PD/PSE 10. The descriptions above of components of the PD/PSE 10 are also applicable, mutatis mutandis, to corresponding components of the PD/PSE 100, and duplication of such descriptions is omitted below. Although the PD/PSE 100 is one example implementation of the PD/PSE 10, the PD/PSE 10 may include other implementation examples and is not limited to the PD/PSE 100.

As shown in FIG. 3, the PD/PSE 100 comprises a PoE PD interface 120, which is an example implementation of the PoE PD interface 20. The PD/PSE 100 also comprises PoE reception circuitry 145, which is an example implementation of the PoE reception circuitry 45; the PoE reception circuitry 145 comprises rectifiers 130 and a PD chip 140. The PD/PSE 100 also comprises a DC-DC converter 160, which is an example implementation of DC-DC converter 60; PSE chip 170, which is an example implementation of the PSE power output circuitry 70, and a PoE PSE interface 175, which is an example implementation of the PoE PSE interface 75. These and other components of the PD/PSE 100 will be described in turn below.

The PoE PD interface 120 comprises a port (e.g., RJ45 jack) which comprises a plurality of electrical contacts 121 configured to electrically connect with complementary contacts of a connector of an Ethernet cable plugged into the port of the PoE PD interface 20. The contacts 121 are grouped into pairs 122 (only one is labeled), with each pair 122 having one differential signal pair applied thereto. That is, one contact 121 of a pair 122 carries one of the alternating signals that makes up a differential signal pair, while the other contact 121 of the same pair 122 carries the other alternating signal that makes up the differential signal pair. In some examples, the PoE PD interface 120 comprises eight of the contacts 121 arranged into four pairs 122. The contacts 121 are conventionally numbered 1 through 8, with pairings between these contacts 121 being as shown in FIG. 4.

The two contacts 121 of a given pair 122 are connected to a corresponding pair of data lines 128 via a transformer 125. The transformer 125 passes the differential signal pair carried by the pair 122 to the data lines 128 while also providing electrical isolation therebetween for safety. The differential signal pair comprises data communications encoded in the alternation of the signals, as would be familiar to those of ordinary skill in the art. The two contacts 121 of a pair 122 are connected to opposite ends of the same winding of the transformer 125.

In addition to encoding data communications, some of the differential signal pairs may also carry PoE power signals. These PoE power signals may be extracted from the differential signal pairs via center taps 123 of the transformers 125. The power lines 126 are each connected to one of the center taps 123 of a corresponding one of the transformers 125. Specifically, the power line 126 labeled CM1 is connected to the center tap 123 of the 1,2 contact pair 122, the power line 126 labeled CM2 is connected to the center tap 123 of the 3, 6 contact pair 122, the power line 126 labeled CM3 is connected to the center tap 123 of the 4, 5, contact pair 122, and the power line 126 labeled CM4 is connected to the center tap 123 of the 7, 8, contact pair 122. In some examples, to supply the PoE power signals, the PSE shifts a central voltage of one of the differential signal pairs relative to the central voltage of another one of the differential signal pairs, which results in one of the center taps 123 having a greater electrical potential than another one of the center taps, which results in a DC voltage difference being applied between a pair 127 of the power lines 126. This DC voltage difference between a pair 127 of the power lines 126 forms a PoE power signal.

For example, if the PSE sets the central voltage of the differential signal pair applied to the 1, 2 contact pair 122 to a potential $V_A$ while setting the central voltage of the differential signal pair applied to the 3, 6 contact pair 122 to a potential $V_B$, then the potential $V_A$ will be applied to the power line 126 labeled CM1 while the potential $V_B$ will be applied to the power line 126 labeled CM2. Consequently, a voltage difference of $V_c=V_A-V_B$ will be applied between the power lines 126 labeled CM1 and CM2, which form a first power line pair 127-1. Thus, if $V_A$ is greater than $V_B$, then CM1 will be the "hot" power line 126 of the pair 127-1 and CM2 will be the "return" power line 126 of the pair 127-1. Conversely, if $V_A$ is less than $V_B$, then CM1 will be the "return" power line 126 of the pair 127-1 and CM2 will be the "hot" power line 126 of the pair 127-1.

Alternatively, the PSE may choose to supply the PSE power signals via the differential signal pairs applied to the 4,5 and 7,8 contact pairs, which would result in a DC voltage difference between the power lines 126 labeled CM3 and CM4, which form a second power line pair 127-2.

As shown in FIG. 3, the PD/PSE 100 also comprises two rectifiers 130, namely a first rectifier 130-1 and a second rectifier 130-2. The first rectifier 130-1 is connected to the first power line pair 127-1 (i.e., to power lines 126 CM1 and CM2), whereas the second rectifier 130-2 is connected to the second power line pair 127-2 (i.e., to power lines 126 CM3 and CM4). The rectifiers 130 each use diodes as the rectifying elements and comprise a diode bridge. In various other examples of the PD/PSE 100 (not illustrated), the rectifier architecture shown in FIG. 3 is used except that the didoes are replaced with alternative rectifying elements, such as thyristors, silicon-controlled-rectifiers, or any other rectifying elements known in the art. In other examples, the rectifier architectures other than a diode bridge may be used as the rectifiers 130. Often rectifiers are used to convert AC signals into DC, but as noted above in the PD/PSE 110 the PoE power signals are generally already in DC form when applied to the power lines 126. Thus, rather than the rectifiers 130 serving the purpose of converting AC to DC, in some examples the rectifiers 130 are instead provided primarily to ensure that each of the PoE power signals has a desired voltage polarity when received at input terminals of the PD chip 140. This function may be needed because, in some PoE systems, the polarity of the PoE power signals as applied to the power lines 126 are not necessarily fixed. In other words, a given PSE may apply the larger potential to a first power line 126 of a pair 127, making it the "hot" line, but then a different PSE may apply the smaller potential to the first power line 126 of the pair 127, making it the "return" line. Thus, the PD/PSE 110 cannot know in advance which power lines 126 will be "hot" and which will be "return," and the rectifiers 130 ensure that whichever arrangement is used, the correct polarity reaches the PD chip 140.

As shown in FIG. 4, if the PD/PSE 100 is currently being powered by input PoE power PD+/PD− received from the PD interface 120, this input PoE power PD+/PD− passes through the rectifiers 130 and is supplied to the inputs of the PD chip 140. The PD+ potential is also supplied directly to the node 146 and becomes the potentials $V_{DD}$ (in this case, $V_{DD}$ and PD+ are the same potential, just given different labels). On the other hand, PD− passes through internal circuitry of the PD chip 140 before being output as $V_{SS}$ to the node 147 ($V_{SS}$ and PD− are essentially the same potential, except for very small losses due to internal resistance in the PD chip 140). The PD chip 140 can selectively break or establish this connection of PD− to node 147, and in this manner the PD chip 140 can control whether the input PoE power PD+/PD− flows past, or is stopped by, the PD chip 140.

The PD chip 140 comprises a microchip configured to perform various operations related to managing PoE power received via the PD interface 120, such as negotiating with an upstream PSE for PD detection and PD classification, controlling a power up sequence, performing inrush control, and/or measuring power consumption. Similarly, the PD/PSE 100 also comprises PSE chip 170, which comprises a microchip configured to perform various operations related to managing the supply of PoE power from the PSE interface 175, such as negotiating with a downstream PD for PD detection and PD classification and/or measuring power consumption.

If the PD/PSE 100 is currently being powered by the DC input 148, the input DC power DC+/DC− received from DC input 148 is conveyed to the nodes 146 and 147, where it becomes the potentials $V_{DD}$ and $V_{SS}$, respectively (in this case, DC+ is the same as $V_{DD}$ and DC− is the same as $V_{SS}$).

The nodes 146 and 147 are coupled to inputs of the DC-DC converter 160. The DC-DC converter 160 comprises a PWM controller 162, a switch in the form of a transistor 163, and a multi-output transformer 165. The PWM controller 162 and the transistor 163 form PWM switching circuitry which is one example implementation of the PWM switching circuitry 161 described above. The PWM controller 162 generates a PWM signal which is applied to a control terminal (e.g. gate) of the transistor 163 to turn the transistor ON and OFF in pulses having a duty cycle determined by the PWM signal.

The node 146 and the potential $V_{DD}$ carried thereon is connected to a first end 166*a* of a transformer input 166 of the transformer 165, and a second end 166*b* of the transformer input 166 is connected to one side of the transistor 163. The other side of the transistor 163 is connected to a terminal 169 of the PWM controller 162, which is connected via internal circuitry of the PWM controller 162 to the node 147 and hence carries the potential $V_{SS}$. Accordingly, when the transistor 163 is ON (conductive), a current path is established from the node 146 to the node 147 which passes through the transformer input 166. This induces current to also flow through transformer outputs 167 and 168, generating the power signal $V_{DD\_2}/V_{SS\_2}$ on the first transformer output 167 and power signal $V_{DD\_3}/V_{SS\_3}$ on the second transformer output 168. As described above in relation to FIG. 1, the power signal $V_{DD\_2}/V_{SS\_2}$ forms the output PoE power signal output to the PSE chip 170, whereas the power signal $V_{DD\_3}/V_{SS\_3}$ forms the operational power signal output to the device power rails 171. The voltages of these output power signals depend on the turn ratios of the input and the first and second outputs, as well as the duty cycle of the transistor 163, as described above in relation to FIG. 1. Thus, the PWM controller 162 can control the voltages $V_{DD\_2}-V_{SS\_2}$ and $V_{DD\_2}-V_{SS\_2}$ by changing the duty cycle (via the PWM signal).

Voltage measurement and feedback circuitry 164 is provided to monitor the voltage $V_{DD\_2}-V_{SS\_2}$ and feed back the measurement to the PWM controller 162. The circuitry 164 may comprise a voltage monitoring device, such as one or more resistors of known resistance which are coupled across the potentials $V_{DD\_2}$ and $V_{SS\_2}$ such that the voltage can be deduced from the amount of current flowing through the resistors. The measurement of the voltage may be fed back to the PWM controller 162 via an electro-optical isolator, which can communicate the information via light signals without establishing a direct electrical connection. This maintains galvanic isolation between the primary side and the secondary side of the transformer 165. The voltage measurement information may be used by the PWM controller 162 to determine the duty cycle for the transistor 163. Specifically, the PWM controller 162 may control the duty cycle so as to maintain the voltage $V_{DD\_2}-V_{SS\_2}$ at a specified target value (or within a specified range) as described above.

In FIG. 4, only one second transformer output 166-2 is illustrated to simplify the discussion and aid understanding. However, any number of second transformer outputs 166-*n* may be included, each having its own associated secondary winding of the transformer 165 and each receiving its own operational power signal. The voltage of the operational power signal supplied to these additional second transformer outputs 166-*n* would be based on their respective turn ratios, just like with the outputs 166-1 and 166-2 described above.

As noted above, the output PoE power $V_{DD\_2}/V_{SS\_2}$ is supplied from the first transformer output 166-1 to the PSE chip 170, which performs PD detection and PD classification, among other operations. The potential $V_{DD\_2}$ is also supplied directly to the power lines 176. The potential $V_{SS\_2}$ is also supplied to the power lines 176, but first passes through internal circuitry of the PSE chip 170. The PSE chip 170 may be able to selectively break or establish this connection of $V_{SS}$ to power line 176, and thus, the PSE chip 170 can control whether the PoE power $V_{DD\_2}/V_{SS\_2}$ can flow through the PSE interface 175 by switching the internal connection of the $V_{SS\_2}$ potential to the power lines 176. In other examples, the $V_{SS\_2}$ potential is supplied directly to the power lines 176 and the $V_{DD\_2}$ potential is passed through the internal circuitry of the PSE chip 170.

After passing the PSE chip 170, the output PoE power $V_{DD\_2}/V_{SS\_2}$ (which may also be referred to as output PoE power PSE+/PSE−) flows via power lines 176 to the PSE interface 175. The PoE PSE interface 175 may be similar in structure to the PD interface 120, except being configured to output PoE power instead of receiving it. The PSE interface 175 comprises a port (e.g., RJ45 jack) which comprises a plurality of electrical contacts 173 configured to electrically connect with complementary contacts of a connector of an Ethernet cable plugged into the port of the PoE PSE interface 175. The contacts 173 are grouped into pairs 172 (only one is labeled), with each pair 172 having one differential signal pair applied thereto. The contacts 173 are connected to transformers 177, in a similar manner to the PD interface 120. In addition, at least two of the center taps of the transformers 177 are connected to a pair of output power lines 176 to receive the output PoE power. Specifically, in some examples, the transformers 177 connected to contacts 1,2 and 3,6 have their center taps coupled to the power lines 176, as indicated by the solid lines in FIG. 4, so that PoE power is output from PSE interface 175 via contacts 1,2, 3, and 6. In other examples, the transformers 177 connected to contacts 4,5 and 7,8 have their center taps coupled to the power lines 176, as indicated by the dashed lines in FIG. 4, so that PoE power is output from PSE interface 175 via contacts 4, 5, 7, and 8. In other examples, power lines 176 are coupled to the center taps of all of the transformers 177 (e.g., both the solid line connections and the dashed lined connections illustrated in FIG. 4), so that PoE power is output via all of the contacts. In FIG. 4, the potential $V_{DD\_2}$ is shown as being connected to contacts 3,6 or 6,8, whereas the potential $V_{SS\_2}$ is shown as being connected to contacts 1,2 or 4,5, but this is merely one example, and in other implementations the potentials could be supplied to different contacts.

The PD/PSE 100 also comprises communication and control circuitry 150, which is similar to the communication and control circuitry 50 described above.

Turning now to FIG. 5, a method 500 will be described. As shown in FIG. 5, the method 500 comprises operations of blocks 502, 504, 506, and 508 which are described in greater detail below. The method 500 may be performed by a hybrid PD/PSE, such as the PD/PSE 10 or PD/PSE 100 described above, or by a person using such a PD/PSE.

In block 502, the PD/PSE receives input power. The input power may be input PoE power received from an upstream PSE, or input DC power received from an external power source.

In block 504, the PD/PSE directs the received input power to a DC-DC converter, which comprises a multi-output transformer.

In block 506, the PD/PSE uses the DC-DC converter to convert the input power into at least two output power signals: (1) a PoE output power signal, which is supplied to a PSE port of the PD/PSE from a first transformer output of the transformer, and (2) operational power signal supplied to a device power rail of the PD/PSE from a second transformer output of the transformer.

In block 508, the PD/PSE monitors the PoE output power and controls a gain of the DC-DC converter based on the PoE output power. More specifically, in some examples the controlling the gain comprises controlling a duty cycle of switching circuitry which supplies the input power to the transformer in pulses.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as connected may be electronically or mechanically directly connected, or they may be indirectly connected via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A hybrid powered device/power sourcing equipment (PD/PSE), comprising:

a powered device (PD) interface configured to removably receive a connector of an ethernet cable to communicably connect the PD/PSE to an upstream power sourcing equipment (PSE) and receive input power-over-Ethernet (POE) power from the PSE;

a PSE interface configured to removably receive another connector of another ethernet cable to communicably connect the PD/PSE to a downstream PD and to supply output PoE power to the PD;

a device power rail to supply operational power to one or more components of the PD/PSE; and a DC-DC converter comprising a multi-output transformer comprising a transformer input, a first transformer output electrically connected to the PSE interface, and a second transformer output electrically connected to the device power rail, wherein DC-DC converter is configured to receive the input PoE power and, in response, supply the input PoE power to the transformer input, generate the output PoE power at the first transformer output, and generate the operational power at the second transformer output and supply the operational power from the second transformer output to the device power rail.

2. The PD/PSE of claim 1,
wherein the DC-DC converter is configured to monitor the output PoE power generated at the second transformer output and to adjust a gain of the DC-DC converter based on the output PoE power.

3. The PD/PSE of claim 2,
wherein the DC-DC converter comprises switching circuitry configured to supply the input PoE power to the transformer input in pulses at a duty cycle; and
wherein the DC-DC converter is configured to adjust the gain by adjusting the duty cycle.

4. The PD/PSE of claim 3,
wherein the switching circuitry comprises:
a switch configured to supply the input power to the transformer input according to the duty cycle; and
a pulse-width-modulation (PWM) controller configured to control the duty cycle by supplying a PWM signal to a control terminal of the switch.

5. The PD/PSE of claim 4,
wherein the PWM controller is configured to control the duty cycle based on the output PoE power such that the output PoE power is maintained at a predetermined target voltage or within a predetermined target voltage range.

6. The PD/PSE of claim 5, comprising:
wherein the predetermined target voltage is 54V and a turns ratio of primary windings to first secondary windings is $N_p/N_{s1}=0.5$, where the primary windings are associated with the transformer input and the first secondary windings are associated with the first transformer output.

7. The PD/PSE of claim 6, comprising:
wherein a turns ratio of the primary windings to second secondary windings is $N_p/N_{s2}=2.25$, where second secondary windings are associated with the second transformer output.

8. The PD/PSE of claim 4, comprising:
voltage measurement and feedback circuitry configured to measure the voltage of the output PoE power generated at the second transformer and feedback information indicative of the measured voltage to the PWM controller.

9. The PD/PSE of claim 1, comprising:
a DC power port configured to receive input DC power from an external power source, and
wherein DC-DC converter is configured to receive the input DC power and, in response, supply the input DC power to the transformer input, generate the output PoE power at the first transformer output, and generate the operational power at the second transformer output.

10. The PD/PSE of claim 1, comprising:
a PD chip configured to receive the input PoE power from the PD interface and supply the input PoE power to the DC-DC converter.

11. The PD/PSE of claim 1, comprising:
a PSE chip configured to receive the output PoE power from the first transformer output and supply the output PoE power to the PSE interface.

12. The PD/PSE of claim 1,
wherein the DC-DC converter comprises switching circuitry configured to supply the input PoE power to the transformer input in pulses at a duty cycle,
wherein the DC-DC converter is configured to control a gain of the DC-DC converter for both the output PoE Power and the operational power by adjusting the duty cycle based on the voltage of the output PoE power and without regard to the voltage of the operational power.

13. A system comprising:
the PD/PSE of claim 1;
the upstream PSE connected to the PD/PSE by a first ethernet cable connected to the PD interface;
the downstream PD connected to the PD/PSE by a second ethernet cable connected to the PSE interface;
wherein the PSE is configured to supply the input PoE power to the PD/PSE, and
wherein the PD/PSE is configured to supply the output PoE power to the PD.

14. A system comprising:
the PD/PSE of claim 9, wherein the external power source is connected to the DC power port to supply the input DC power;
the downstream PD connected to the PD/PSE by an ethernet cable connected to the PSE interface;
wherein the PD/PSE is configured to supply the output PoE power to the PD.

15. A method comprising:
receiving input power at a hybrid powered device/power sourcing equipment (PD/PSE);
directing the received input power to a DC-DC converter comprising a multi-output transformer;
converting, by the DC-DC converter, the input power into at least two output power signals including:
a PoE output power signal generated at a first transformer output of the transformer; and
an operational power signal generated at a second transformer output of the transformer;
supplying the output PoE power from the first transformer output to a PSE port of the PD/PSE; and
supplying the operational power signal from the second transformer output to a device power rail of the PD/PSE.

16. The method of claim 15, comprising:
monitoring the output PoE power; and
controlling a gain of the DC-DC converter based on the output PoE power.

17. The method of claim 16,
wherein controlling the gain comprises controlling a duty cycle of switching circuitry which supplies the input power to the transformer in pulses such that the voltage of the output PoE power is maintained at a predetermined target voltage or within a predetermined target range.

18. The method of claim 15,
wherein the input power comprises input PoE power received from an upstream PSE.

19. The method of claim 15,
wherein the input power comprises input DC power received from an external power source.

20. The method of claim 15,
supplying the output PoE power from the PSE port of the PD/PSE to a downstream PD connected to the PSE port by an ethernet cable.

* * * * *